(12) United States Patent
Brown et al.

(10) Patent No.: US 9,981,725 B1
(45) Date of Patent: May 29, 2018

(54) SOLAR POWERED LED LIFE JACKET SYSTEM

(71) Applicants: Daryl Brown, Auburndale, FL (US);
Joy Brown, Auburndale, FL (US)

(72) Inventors: Daryl Brown, Auburndale, FL (US);
Joy Brown, Auburndale, FL (US)

( * ) Notice: Subject to any disclaimer, the term of this patent is extended or adjusted under 35 U.S.C. 154(b) by 0 days. days.

(21) Appl. No.: 15/266,706

(22) Filed: Sep. 15, 2016

Related U.S. Application Data

(60) Provisional application No. 62/220,063, filed on Sep. 17, 2015.

(51) Int. Cl.
B63C 9/20 (2006.01)
B63C 9/11 (2006.01)
H01L 31/12 (2006.01)
H02S 99/00 (2014.01)
H02S 40/38 (2014.01)
F21S 9/03 (2006.01)
F21V 33/00 (2006.01)
F21V 23/04 (2006.01)
F21V 31/00 (2006.01)
F21Y 115/10 (2016.01)

(52) U.S. Cl.
CPC ............... B63C 9/20 (2013.01); B63C 9/11 (2013.01); F21S 9/037 (2013.01); F21V 23/04 (2013.01); F21V 31/00 (2013.01); F21V 33/0064 (2013.01); H01L 31/12 (2013.01); H02S 40/38 (2014.12); H02S 99/00 (2013.01); F21Y 2115/10 (2016.08)

(58) Field of Classification Search
CPC .................................. B63C 9/20; B63C 98/20
See application file for complete search history.

(56) References Cited

U.S. PATENT DOCUMENTS

| 6,910,931 | B1 * | 6/2005 | Nakase | B63C 9/20 126/204 |
| 2010/0290493 | A1 * | 11/2010 | Kawanishi | H01S 5/22 372/46.01 |
| 2012/0033411 | A1 * | 2/2012 | Heo | G08B 5/004 362/108 |
| 2012/0164898 | A1 * | 6/2012 | McKinney | B63C 9/20 441/89 |

* cited by examiner

Primary Examiner — Stephen P Avila

(57) ABSTRACT

A vest has a back and a front with a vertical opening, laterally spaced sides with arm holes, a neck hole, a waist hole, an interior surface and an exterior surface. A plurality of front light emitting diodes are on the front of the vest and a plurality of back light emitting diodes are on the back of the vest. A battery and a plurality of solar panels on the vest power the light emitting diodes.

1 Claim, 5 Drawing Sheets

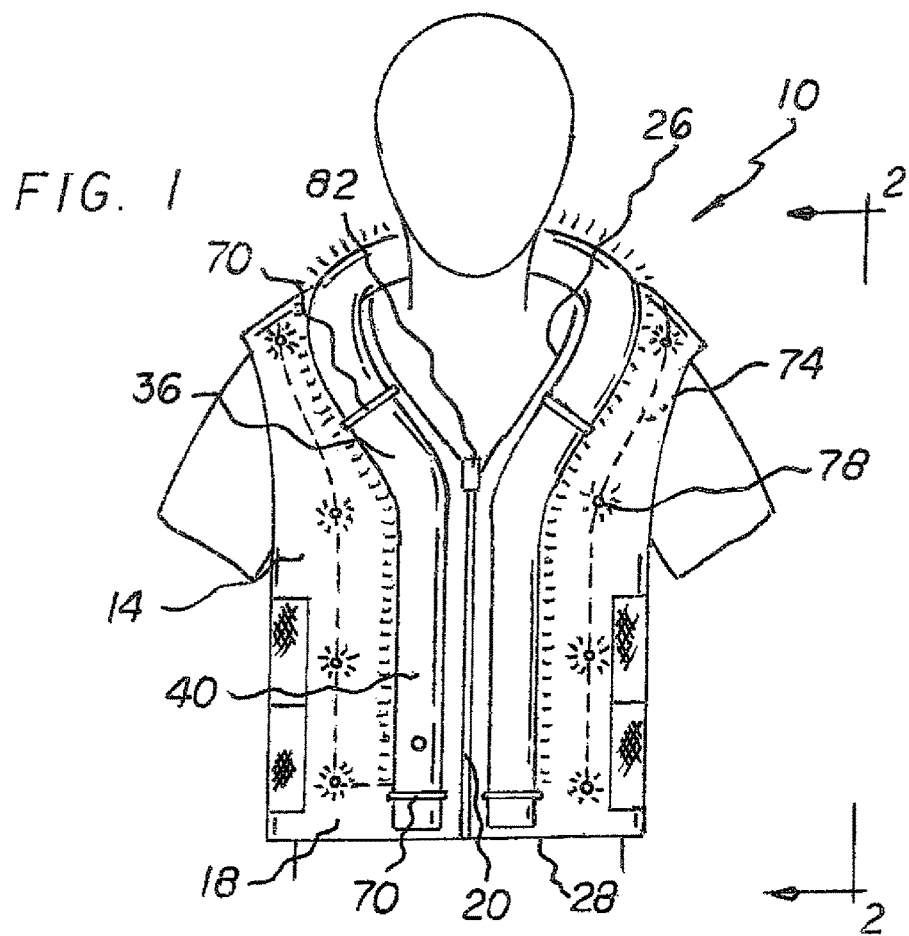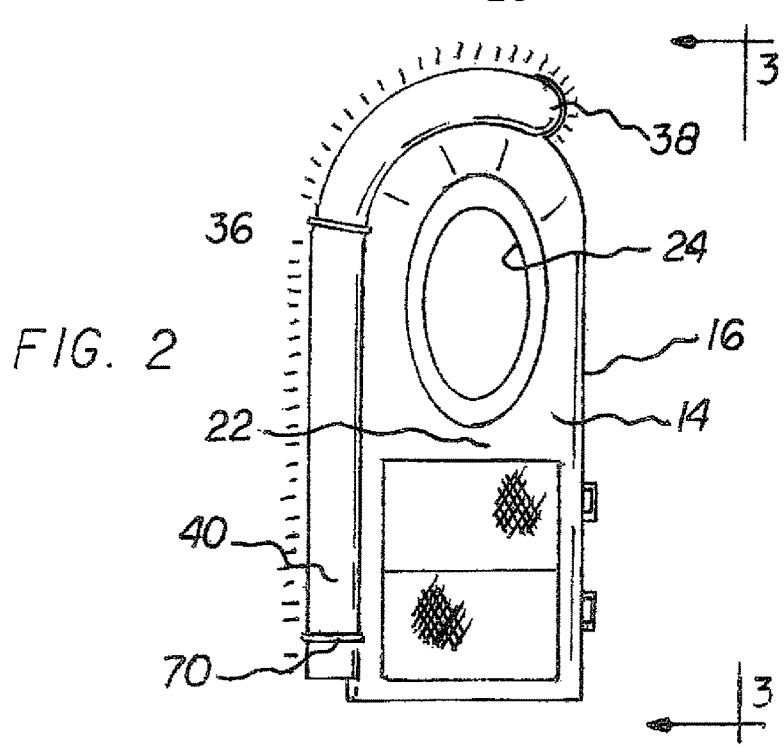

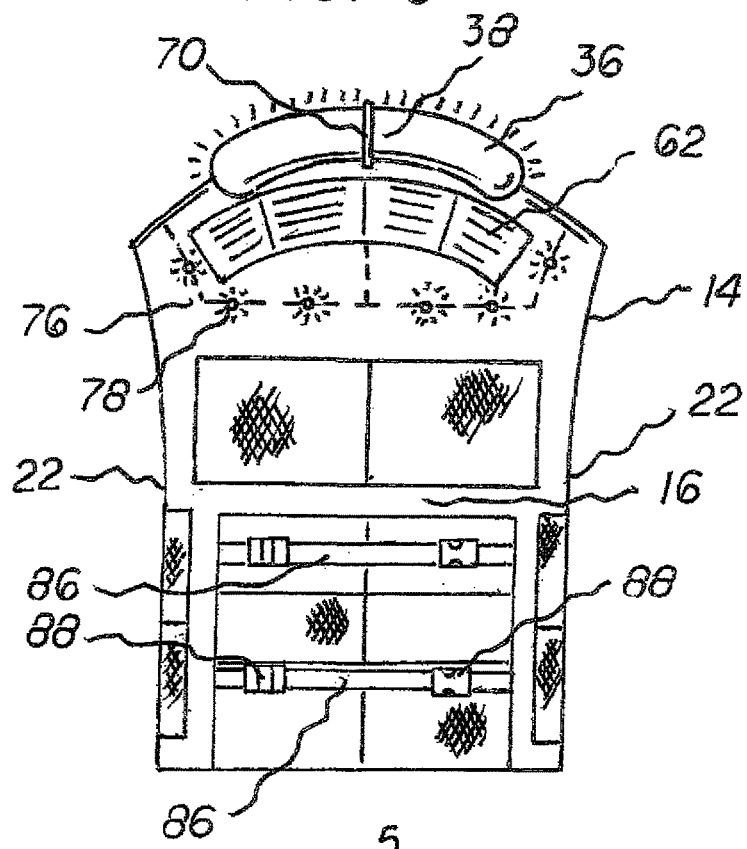
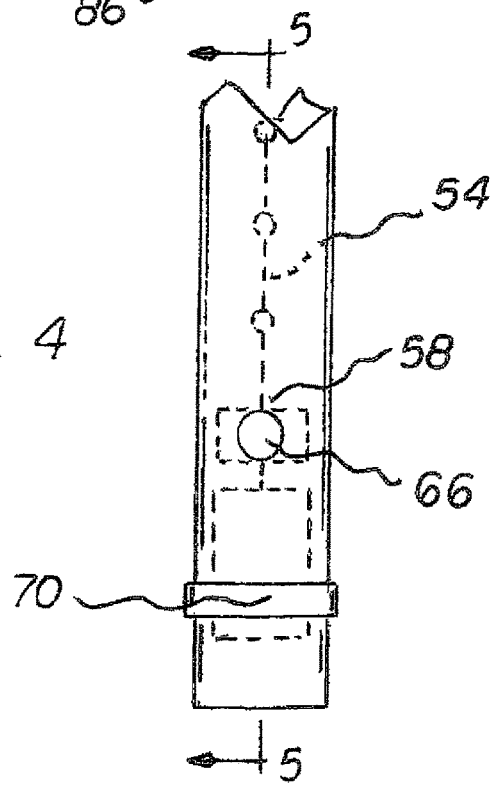

SOLAR POWERED LED LIFE JACKET SYSTEM

RELATED APPLICATION

The present application is based upon Provisional Application No. 62/220,063 filed Sep. 17, 2015, the priority of which is hereby claimed and the subject matter of which is incorporated herein by reference.

BACKGROUND OF THE INVENTION

Field of the Invention

The present invention relates to a solar powered LED life jacket system and more particularly pertains to providing buoyancy to a person lost at sea and for providing illumination to facilitate finding the person. The providing of buoyancy and illumination are done in a safe, convenient, and economical manner.

Description of the Prior Art

The use of life jacket systems of known designs and configurations is known in the prior art. More specifically, life jacket systems of known designs and configurations previously devised and utilized for the purpose of providing buoyancy and illumination to a person lost at sea are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a solar powered LED life jacket system that allows providing buoyancy to a person lost at sea and for providing illumination to facilitate finding the person. The providing of buoyancy and illumination are done in a safe, convenient, and economical manner.

In this respect, the solar powered LED life jacket system according to the present invention substantially departs from the conventional concepts and designs of the prior art, and in doing so provides an apparatus primarily developed for the purpose of providing buoyancy to a person lost at sea and for providing illumination to facilitate finding the person. The providing of buoyancy and illumination are done in a safe, convenient, and economical manner.

Therefore, it can be appreciated that there exists a continuing need for a new and improved solar powered LED life jacket system which can be used for providing buoyancy to a person lost at sea and for providing illumination to facilitate finding the person. The providing of buoyancy and illumination are done in a safe, convenient, and economical manner. In this regard, the present invention substantially fulfills this need.

SUMMARY OF THE INVENTION

In view of the foregoing disadvantages inherent in the known types of life jacket systems of known designs and configurations now present in the prior art, the present invention provides an improved solar powered LED life jacket system. As such, the general purpose of the present invention, which will be described subsequently in greater detail, is to provide a new and improved solar powered LED life jacket system and method which has all the advantages of the prior art and none of the disadvantages.

To attain this, the present invention essentially comprises a vest having a back and a front with a vertical opening, laterally spaced sides with arm holes, a neck hole, a waist hole, an interior surface and an exterior surface. A plurality of front light emitting diodes are on the front of the vest and a plurality of back light emitting diodes are on the back of the vest. A battery and a plurality of solar panels on the vest power the light emitting diodes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved solar powered LED life jacket system which has all of the advantages of the prior art life jacket systems of known designs and configurations and none of the disadvantages.

It is another object of the present invention to provide a new and improved solar powered LED life jacket system which may be easily and efficiently manufactured and marketed.

It is further object of the present invention to provide a new and improved solar powered LED life jacket system which is of durable and reliable constructions.

An even further object of the present invention is to provide a new and improved solar powered LED life jacket system which is susceptible of a low cost of manufacture with regard to both materials and labor, and which accordingly is then susceptible of low prices of sale to the consuming public, thereby making such solar powered LED life jacket system economically available to the buying public.

Even still another object of the present invention is to provide a solar powered LED life jacket system for providing buoyancy to a person lost at sea and for providing illumination to facilitate finding the person. The providing of buoyancy and illumination are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a solar powered LED life jacket system constructed in accordance with the principles of the present invention.

FIG. 2 is a side elevational view of the system taken along line 2-2 of FIG. 1.

FIG. 3 is a rear elevational view of the system taken along line 3-3 of FIG. 2.

FIG. 4 is an enlarged illustration of one end of the hollow collar.

The same reference numerals refer to the same parts throughout the various Figures.

DESCRIPTION OF THE PREFERRED EMBODIMENT

Figure 6:
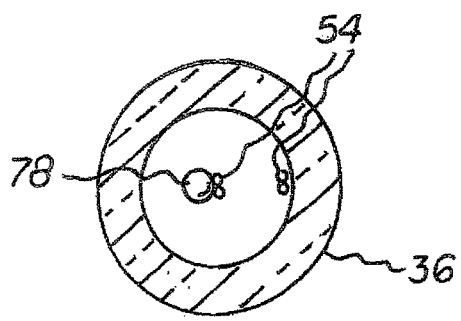
FIG. 6 is a cross sectional view taken along line 6-6 of FIG. 5.

With reference now to the drawings, and in particular to FIG. 1 thereof, the preferred embodiment of the new and improved solar powered LED life jacket system embodying the principles and concepts of the present invention and generally designated by the reference numeral 10 will be described.

The present invention, the solar powered LED life jacket system 10 is comprised of a plurality of components. Such components in their broadest context include a vest, a plurality of light emitting diodes, a source of electrical potential, and a plurality of solar panels. Such components are individually configured and correlated with respect to each other so as to attain the desired objective.

Figure 8:
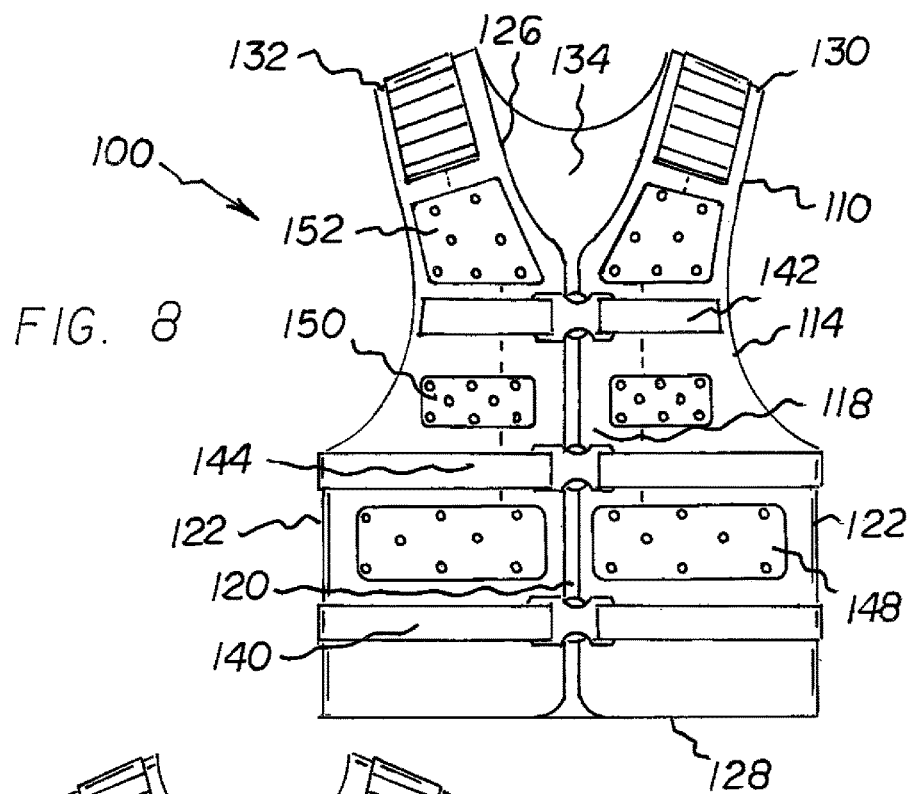
FIG. 8 is a front elevational view of an alternate embodiment of the invention.
Figure 9:
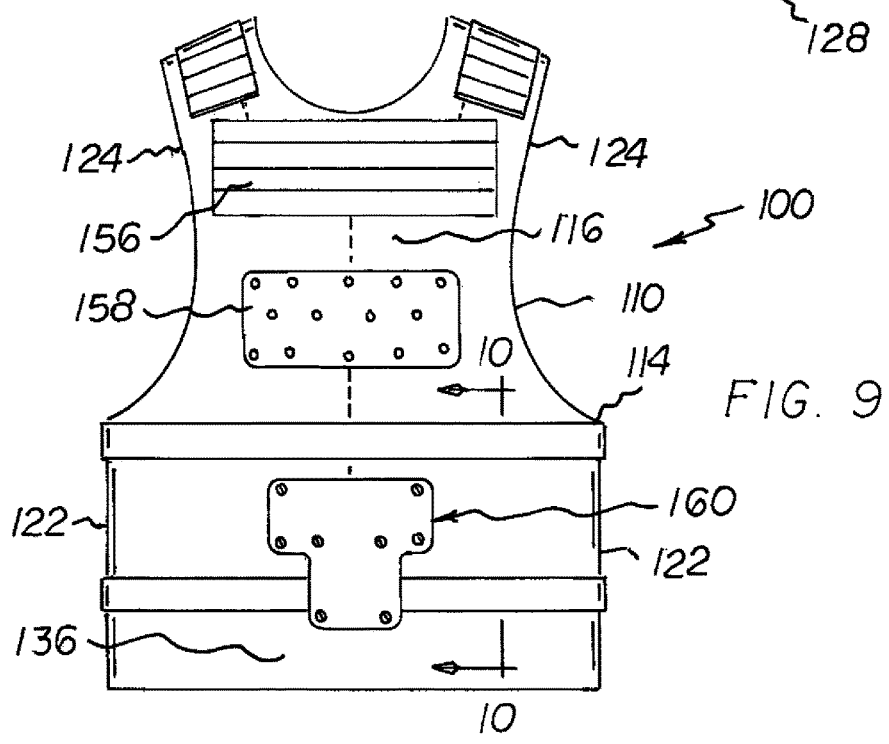
FIG. 9 is a rear elevational view of the system shown in FIG. 8.
Figure 10:
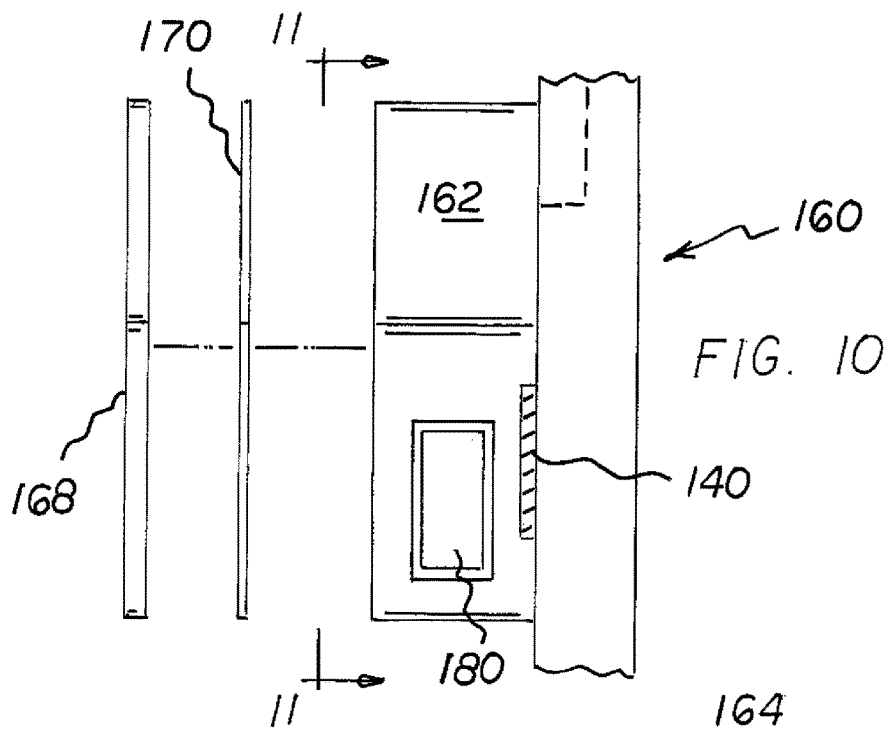
FIG. 10 is a cross sectional view taken along line 10-10 of FIG. 9.
Figure 11:
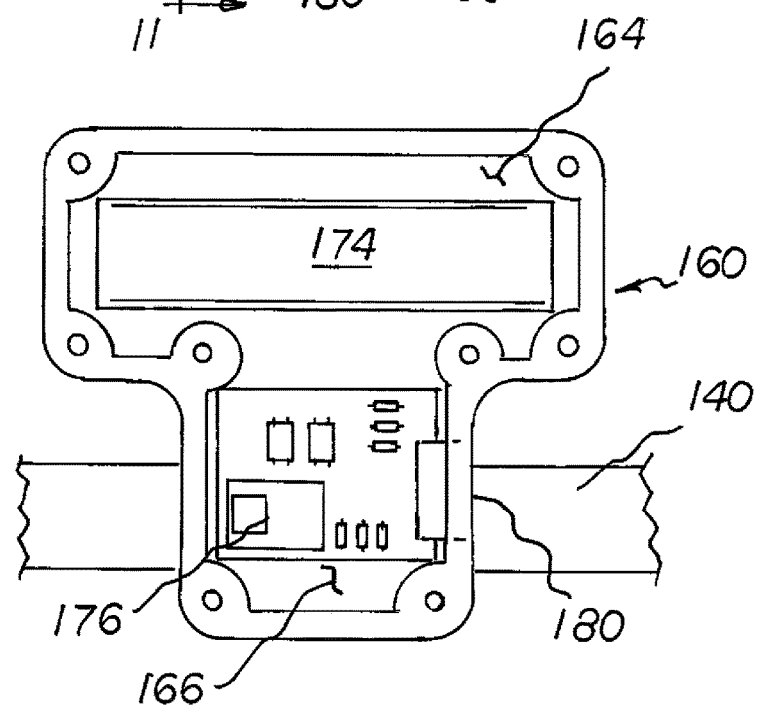
FIG. 11 is a front elevational view taken along line 11-11 of FIG. 10.

The preferred embodiment of the invention is shown in FIGS. 8-11. The solar powered LED life jacket system 110 is for providing buoyancy to a person lost at sea and for providing illumination to facilitate finding the person. The providing of buoyancy and illumination are done in a safe, convenient, and economical manner. First provide in the preferred embodiment is a vest 114 having an imperforate back 116, a front 118 with a vertical opening 120, and laterally spaced sides 122 with arm holes 124. The vest also has a neck hole 126 above and a waist hole 128 below. The vest has a left shoulder 130 and a right shoulder 132. The vest has an interior surface 134 and an exterior surface 136. The vest is fabricated of buoyant materials.

Next in the preferred embodiment, a lower belt with a lower buckle 140 is provided. The lower belt encompasses the vest adjacent to the waist hole and spans the vertical opening. An upper belt with an upper buckle 142 is also provided. The upper belt is adjacent to the neck hole and spans the vertical opening. An intermediate belt with an intermediate buckle 144 is also provided. The intermediate belt encompasses the vest adjacent to the neck hole and spans the vertical opening.

Two similarly configured front lower panels 148 are provided between the lower belt and the intermediate belt. One front lower panel is on each side of the vertical opening. Two similarly configured front intermediate panels 150 are provided between the intermediate belt and the upper belt. One front intermediate panel is on each side of the vertical opening. Two similarly configured front upper panels 152 are provided above the upper belt on the left shoulder and the right shoulder respectively. One front upper panel is on each side of the vertical opening. The front lower panels, the front intermediate panels, and the front upper panels all have a front surface with a plurality of light emitting diodes.

Next provided in the preferred embodiment is a back upper panel 156 of a die cut reflective material with imbedded light emitting diodes. The back upper panel is located beneath and in proximity to the neck opening. A back intermediate panel 58 is between the back upper panel and the intermediate belt. The back intermediate panel has a front surface with a plurality of light emitting diodes.

A housing 160 is next provided in the preferred embodiment. The housing is in a T-shaped configuration with a horizontal upper chamber 162 and a vertical lower chamber 164. A cover plate 168 is provided for the housing with a gasket 170 between the housing and the cover plate. Threaded fasteners 172 removably secure the cover plate and gasket to the housing. The housing and cover plate are fabricated of a rigid, water impervious material. A source of electrical potential in the form of a rechargeable battery 174 is provided within the upper chamber and electrical components 176 are provided within the lower chamber. An access port 180 on the housing is provided to facilitate recharging the rechargeable battery.

Lastly, in the preferred embodiment, a plurality of solar panels 184 are provided on the left shoulder and the right shoulder respectively for powering the light emitting diodes.

Figure 5:
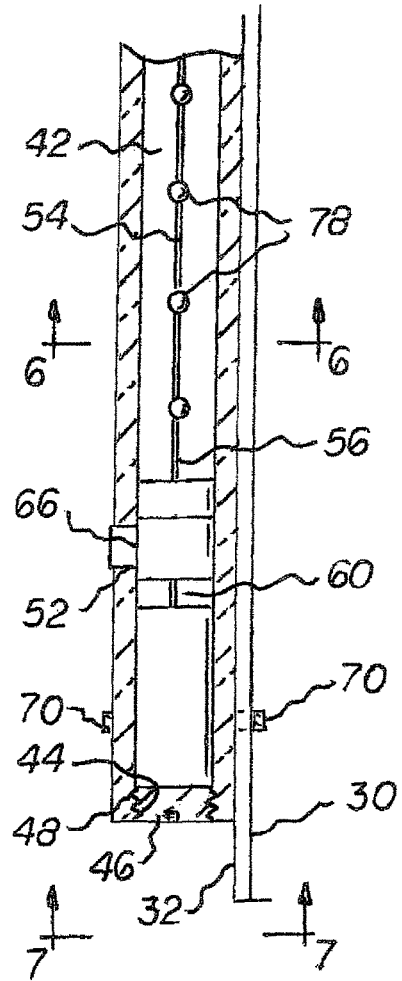
FIG. 5 is a cross sectional view taken along line 5-5 of FIG. 4.
Figure 7:
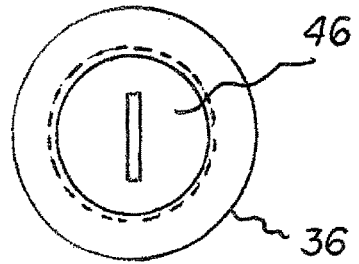
FIG. 7 is an end elevational view taken along line 7-7 of FIG. 5.

Reference is now made to FIGS. 1-7. In this alternate embodiment of the solar powered LED life jacket system 10, first provided is a vest 14. The vest has an imperforate back 16. The vest has a front 18. The front has a vertical opening 20. The vest has laterally spaced sides 22. The sides have arm holes 24. The vest has a neck hole 26 above. The vest has a waist hole 28 below. The vest has an interior surface 30 and an exterior surface 32. The vest is fabricated of buoyant materials.

Next in this alternate embodiment, a collar 36 is provided. The collar is secured to the exterior surface of the vest. The collar has a central section 38. The central section is located around the neck hole. The collar has parallel end sections 40. The parallel end sections are located along the vertical opening. The collar has free ends 42. The free ends are adjacent to the waist hole. The collar is fabricated of an elastomeric closed cell polyurethane foam in a tubular in configuration with a cylindrical chamber 42 between the free ends. The free ends have female screw threads 44. Plugs 46 with male screw threads 48 are removably received in the free ends. In this manner the chamber is rendered waterproof.

Also provided in this alternate embodiment is a primary illumination assembly 52. The primary illumination assembly is located within the chamber. The primary illumination assembly includes a length of primary electrical wires 54. The primary electrical wires have a first terminal end 56 and a second terminal end 58. A source of potential 60, 62 is provided. The source of potential is operatively coupled to primary electrical wires. The source of potential is a battery 60 located within the chamber. The battery has an associated switch 66 to activate and inactivated the LEDs.

Ties 70 are provided in the alternate embodiment. The ties couple the collar to the vest at spaced locations along the collar.

Also provided in the alternate embodiment is a secondary illumination assembly 74. The secondary illumination assembly is located exterior of the chamber. The secondary illumination assembly includes a length of supplemental electrical wires 76. The supplemental electrical wires are adjacent to the collar. The secondary illumination assembly includes a plurality of secondary LEDs 78. The secondary LEDs are coupled to the supplemental electrical wires. The secondary LEDs are secured to the exterior surface of the vest.

Provided next in the alternate embodiment are solar panels 62. The solar panels are located on the back of the vest between the collar and the supplemental electrical wires. The solar panels function as a supplemental source of potential.

Further provided in the alternate embodiment is a sliding fastener 82. The sliding fastener is secured to the vest adjacent to the vertical opening. In this manner the vest may be opened and closed.

Provided last in the alternate embodiment are adjustment straps 86. The adjustment straps are located on the back of the vest. The straps have buckles 88 to vary the size of the vest to accommodate wearers of varying sizes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar powered LED life jacket system (110) for providing buoyancy to a person lost at sea and for providing illumination to facilitate finding the person, the providing of buoyancy and illumination being done in a safe, convenient, and economical manner, the system comprising, in combination:

a vest (114) having an imperforate back (116), a front (118) with a vertical opening (120), and laterally spaced sides (122) with arm holes (124), the vest having a neck hole (126) above and a waist hole (128) below, the vest having a left shoulder (130) and a right shoulder (132), the vest having an interior surface (134) and an exterior surface (136), the vest being fabricated of buoyant materials;

a lower belt with a lower buckle (140) encompassing the vest adjacent to the waist hole and spanning the vertical opening, an upper belt with, an upper buckle (142) adjacent to the neck hole and spanning the vertical opening, an intermediate belt with an intermediate buckle (144) encompassing the vest adjacent to the neck hole and spanning the vertical opening;

two similarly configured front lower panels (148) between the lower belt and the intermediate belt, one front lower panel on each side of the vertical opening, two similarly configured front intermediate panels (150) between the intermediate belt and the upper belt, one front intermediate panel on each side of the vertical opening, two similarly configured front upper panels (152) above the upper belt on the left shoulder and the right shoulder respectively, one front upper panel on each side of the vertical opening, the front lower panels and the front intermediate panels and the front upper panels all having a front surface with a plurality of light emitting diodes;

a back upper panel (156) of a die cut reflective material with imbedded light emitting diodes, the back upper panel being located beneath and in proximity to the neck opening, a back intermediate panel (158) between the back upper panel and the intermediate belt, the back intermediate panel having a front surface with a plurality of light emitting diodes;

a housing (160) in a T-shaped configuration with a horizontal upper chamber (162) and a vertical lower chamber (164), a cover plate (168) for the housing with a gasket (170) between the housing and the cover plate, threaded fasteners (172) removably securing the cover plate and gasket to the housing, the housing and cover plate being fabricated of a rigid, water impervious material, a source of electrical potential in the form of a rechargeable battery (174) within the upper chamber and electrical components (176) within the lower chamber, an access port (180) on the housing to facilitate recharging the rechargeable battery; and a plurality of solar panels (184) on the left shoulder and the right shoulder respectively for powering the light emitting diodes.

* * * * *